March 22, 1932.     W. J. COULTAS     1,850,385
HAYRAKE
Filed Feb. 23, 1929

Inventor
Wilbur J. Coultas,
By Brown, Jackson, Boettcher & Dienner,
Attorneys

Witness
A. D. McLeay.

Patented Mar. 22, 1932

1,850,385

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

HAYRAKE

Application filed February 23, 1929. Serial No. 341,996.

This invention relates to what are generally known as self dumping hay rakes, or rakes in which the rake head is swung upward to dump its load of gathered hay by forward rotation of one or both of its supporting wheels. The dumping mechanism, which comprises dogs connected with the rake head and movable into engagement with the teeth of ratchet wheels carried by and rotating with the carrying wheels, is normally inoperative and is thrown into operation at the option of the operator. When the rake head has been swung upward to the limit of its dumping movement the dumping mechanism is automatically disconnected and the rake head thereupon returns by gravity to its operative position. Rake heads having these general characteristics are well known in the art, and the invention which constitutes the subject-matter of this application is in the nature of certain improvements by which certain objectionable features of the constructions heretofore employed are avoided, and new and advantageous features are introduced.

In rakes of this type the dogs are thrown into engagement with the ratchet wheels to start and carry on the dumping movement by the operation of a lever, preferably a foot lever, conveniently accessible to the operator, whose seat is mounted on a draft frame connected in front of the rake head and usually on a lower level, the arrangement being such that as the rake head swings in the dumping operation it has a lifting effect on the rear portion of the draft frame. Consequently, the weight of the operator aids in restoring the rake head to its operating position after the dogs have been released from the ratchet wheels by the operation of suitable tripping devices. In operating these rakes it is desirable that the operator be enabled to exert downward pressure upon the rake teeth, to hold them down properly to their work, and it is also desirable that he be enabled to hold the rake teeth up temporarily after the rake head has been released from the ratchet wheels, so that it will not return to its operating position quickly enough to engage and scatter the hay just dumped. Ordinarily, the points of the rake teeth are lifted high enough in dumping to clear the windrow, but sometimes the windrow is higher than usual, either because the operator did not dump the load soon enough, or because the hay is light and bulky and its expansion when dumped abnormally increases the bulk of the windrow. Therefore, if the rake teeth should be permitted to descend immediately upon the release of the dumping mechanism they would be apt to engage parts of the windrow and pull down some of the hay. To realize the above mentioned desirable features is the primary object of this invention, and I accomplish it by providing means by which the operator, through the instrumentality of lever mechanism, preferably a foot lever, may either hold down the rake teeth when raking, or, after the dumping operation, may hold them up temporarily until danger of their engaging the windrow is past.

Another object of the invention is to provide for holding the rake head in its dumping position in such manner that its weight will be carried by such lever mechanism, so that the operator will be relieved of the effort of holding it up. A further object is to provide a construction by which the holding lever will be normally held in a floating or inoperative position, but will nevertheless be constantly available for use for any of its intended purposes. I accomplish these objects as illustrated in the accompanying drawings and hereinafter described. What I regard as new is set forth in the claims.

In the drawings,—

Figure 1:
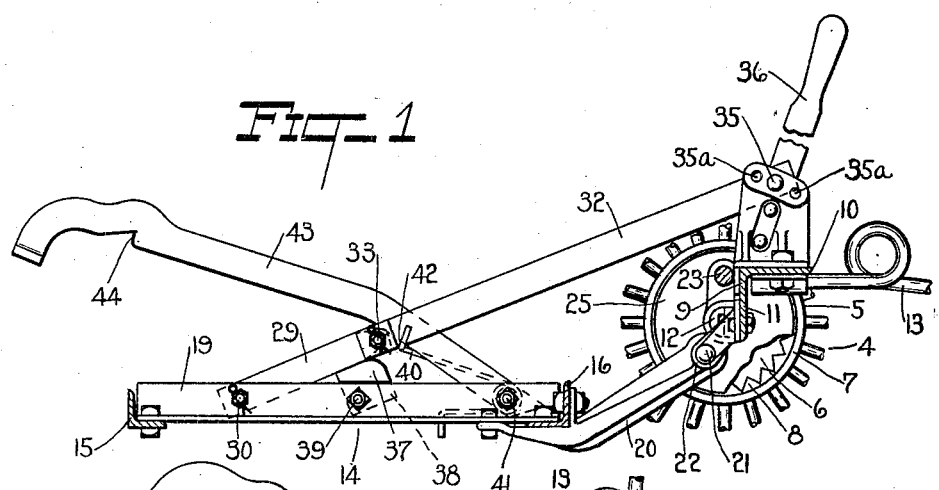
Fig. 1 is a fragmentary view, being a partial longitudinal vertical section taken through the rake head and draft frame substantially on line 1—1 of Fig. 3, showing the rake head in its normal or operating position.

Referring to the drawings,—4 indicates one of the carrying wheels and 5 a ratchet wheel that may be secured to or be formed integral with the hub thereof. As usual, the ratchet wheel 5, one of which is carried by each carrying wheel, preferably comprises a radial portion 6 having an inwardly projecting marginal flange 7 provided with internal ratchet teeth 8. It will be understood that these ratchet wheels turn with the carrying wheels to which they are affixed.

The rake head is of conventional design, and preferably comprises a beam 9 that extends from one of the carrying wheels to the other, this beam being in the form of an angle iron having a horizontal flange 10 and a vertical flange 11. Secured to each end portion of the vertical flange 11 is a stub axle 12 upon which stub axles the carrying wheels 4 are journaled in the usual way. These stub axles are offset a short distance beyond the front face of the vertical flange 11 so that when the rake head is in its operating position said flange lies somewhat back of the axial line of the axles 12, and consequently the rake head may be swung upward and forward from its operating position about the axles 12 as pivotal supports. The rake head carries the usual rake teeth 13 which are secured to its horizontal flange 10 and extend rearwardly therefrom. A draft frame 14, preferably comprises front and rear transverse bars 15, 16, and a central intermediate bar 17. Preferably the end portions of the front bar 15 are bent back so that they diverge rearwardly and are connected with the rear bar 16. Also connecting the front and rear bars at a point somewhat to one side of the bar 17 are two oppositely arranged angle bars 18, 19 set with their vertical flanges close to each other but spaced apart sufficiently to receive between them certain parts that will be hereinafter described. The seat, not shown, is preferably mounted on the bar 17 near its rear end. The draft frame extends forward from the rake head 9 in a horizontal plane somewhat below the axis of the carrying wheels, as shown in Fig. 1, and is pivotally connected with the rake head by rearwardly projecting brackets 20 that are secured to the rear portion of the draft frame at convenient intervals, preferably four of such brackets being provided.

The rear ends of these brackets are connected by pivots 21 with lugs 22 that project downward and forward from the vertical flange 11 of the rake head, as best shown in Fig. 1. When the rake head is actuated, either to dump it, or to return it to its operative position, it swings about the axial line of the stub axles 12, which turn in the carrying wheel bearings, the wheels, of course, rotating on such stub axles. The rake head may, therefore, be swung from the position shown in Fig. 1, where its horizontal flange 10 is in its normal position, to the position shown in Fig. 2, where its horizontal flange 10 assumes an approximately vertical position. In this operation the brackets 20 are swung backward and upward, lifting the rear portion of the draft frame, which carries the driver's seat in the usual way, so that his weight tends not only to check the upward movement of the rake head as it is released from the load and so becomes lighter, but also to move the rake teeth back to their operating position after dumping has been accomplished.

Pivotally mounted on the rake head eccentrically with reference to the stub axles 12 are two rock shafts 23, 24, each of which is approximately half as long as the rake head. These rock shafts are alined with each other and extend in opposite directions from about the center of the rake head to the ratchet wheels 5, their outer ends being journaled in plates or discs 25 on the end portions of the stub axles 12 in position to extend over the inner faces of said ratchet wheels. These plates, which are secured on the stub axles 12 and normally do not turn with the ratchet wheels with which they are associated, are provided with bearings that receive and pivotally support the outer end portions of the rock shafts 23, 24, respectively.

At their outer ends said rock shafts are bent at right angles to form, or are otherwise provided with, dogs that underlie the ratchet teeth 8 and are adapted to be moved into engagement with said teeth by the rocking of said rock shafts, so that when such engagement has been effected the rock shafts, and with them the rake head, may be caused to turn with the ratchet wheels 5 about the axis of the carrying wheels.

In the arrangement shown, rocking the rock shafts 23, 24 in a counterclockwise direction moves their respective dogs into engagement with the ratchet teeth 8, and causes the rake head to swing in the same direction to dump it.

Figure 3:
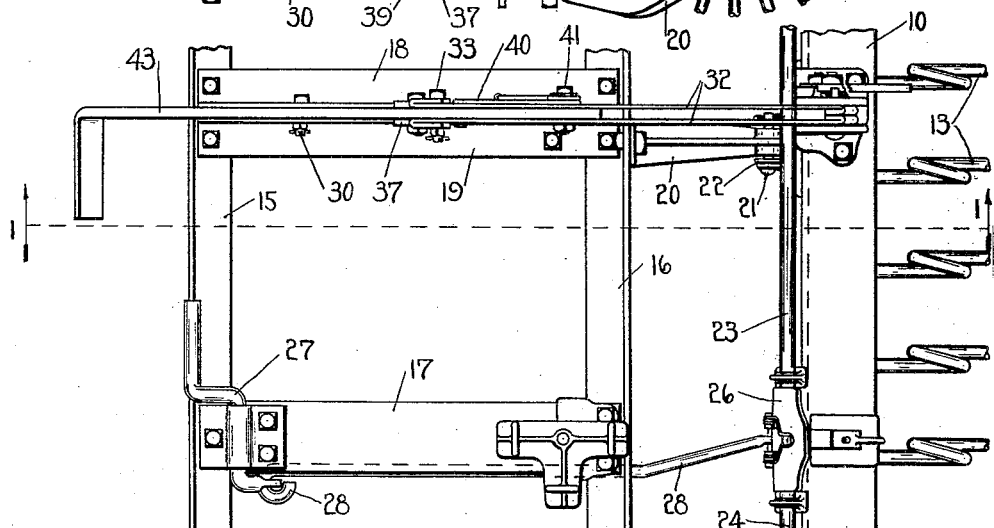
Fig. 3 is a plan view of the parts in the position shown in Fig. 1.

The inner ends of the rock shafts 23, 24 are also bent at right angles to form crank arms that are parallel with each other and lie at opposite sides of and adjacent to the center of the rake head, and extend over the rear face of a trip plate 26, which pivotally carries the inner ends of said rock shafts. The connections between the trip plate and the rock shafts 23, 24 have not been illustrated as my present invention is not dependent upon the specific construction of the tripping devices or the operating connections thereof. The construction that I prefer to employ is fully shown and described in my copending application of even date herewith, Serial No. 341,995, but so far as my present invention is concerned any suitable means for the purpose may be employed. It will be sufficient to say that the rock shafts 23, 24 are rocked to move their dogs into operative engagement with the ratchet teeth 8 by rocking the trip plate 26 in one direction by the actuation of a foot lever 27 mounted on the forward portion of the draft frame 14, preferably on the bar 17, as shown in Fig. 3.

The lever 27 is connected by a connecting rod 28 with said trip plate in such manner that by pressing down on said foot lever the connecting rod 28 will be moved rearwardly to rock the trip plate 26 and the rock shafts 23, 24 in a counterclockwise direction. When the rake head nears the limit of its upward movement the trip plate 26 engages the draft frame, or a suitable stop carried by it, so that further movement of the rake head in the same direction moves the trip plate 26 relatively in the opposite direction and thereby rocks the rock shafts 23, 24 in a clockwise direction to move the dogs out of engagement with the ratchet teeth 8, thereby releasing the rake head so that it may return to its operating position.

Figure 2:
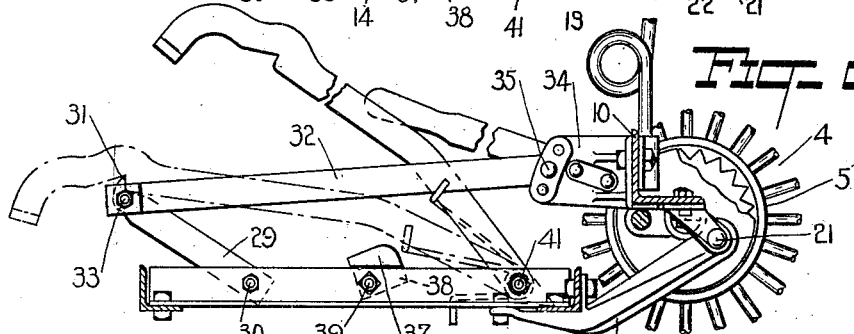
Fig. 2 is a similar view showing the rake head in its dumping position with the parts arranged to hold it in such position.

Coming now to the features that constitute the subject-matter of my present invention, 29 indicates a link the forward end of which extends between the vertical flanges of the bars 18, 19 near their forward ends, and is pivotally connected therewith by a pivot 30. This link is provided at its opposite end with a hook 31, as shown in Fig. 2. A link 32 is pivotally connected with the free end portion of the link 29 by a pivot 33 and extends rearwardly to a standard 34 secured to and rising from the horizontal flange 10 of the rake head. A pivot 35 connects the rearward end of the link 32 with said standard, and may be passed through either of several holes 35ª to vary the range of movement of the rake head under control of the links 29, 32. Said links thus form a toggle, the members of which are approximately alined when the rake head is in its operating position shown in Fig. 1, but when the rake head is swung to dump, the toggle breaks upwardly and the link 29 therefore swings forwardly so that the toggle members then assume a position of acute angularity with respect to each other, as shown in Fig. 2. The link 32 is best made of two parallel bars spaced apart, but this is not essential.

Preferably a hand lever 36 is connected with the standard 34 so that the rake head may be swung by hand when necessary. To prevent the toggle members from coming to a fully alined position, or forming a past center lock, a stop 37 is provided on the draft frame in position to intercept the free end portion of the link 29 and prevent it from swinging backward and downward far enough to fully aline with the link 32. This stop is best secured to the vertical flanges of the bars 18, 19 by providing it with a tongue, indicated by the dotted lines 38 in Fig. 1, which fits between such flanges and is secured thereto by a bolt 39. A spring 40 mounted on a transverse bolt 41 that extends through the vertical flanges of the bars 18, 19 near their rear ends, extends forward and upward and is provided with a stirrup 42 that underlies the toggle link 32 against which it exerts upward stress. In other words, this spring tends to break the toggle and to hold up the link 32.

A foot lever 43 is mounted on the pivot bolt 41 and extends forward and upward between the members of the toggle link 32, and over the stirrup 42 of the spring 40, and the bolt 33 that connects the two toggle members together, so that such spring has a lifting effect on the lever 43 as well as on the link 32. Near its forward end the lever 43 is provided with a notch 44 on its under side that is adapted to be engaged by the hook 31 when the parts assume the position shown in Fig. 2.

When the rake head is in its operating position the several parts are substantially in the relative positions shown in Fig. 1, at which time the toggle links 29, 32 are approximately, but not quite, alined, and the foot lever 43 extends forward and upward over the forward end of the spring 40.

If then the operator wishes to exert downward pressure upon the rake teeth, he can do so by pressing down on the foot lever 43, thereby exerting downward pressure on the bolt 33 and consequently moving the toggle members toward the stop 37. This, of course, has the effect of rocking the rake head in a clockwise direction to move its teeth groundward, but the toggle members as above explained cannot move into locking position because of said stop. Very light pressure by the operator on the lever 43 is required to effect this action because of the nearly alined position of the toggle members. As the toggle members do not form a lock the operator may at any time dump the rake by pressing forward on the foot lever 27 to cause the ratchet mechanism to function in the manner described, and when this occurs the rake head will swing to the position shown in Fig. 2, thereby swinging the toggle members to the position indicated in said figure. This movement causes the toggle link 32 to slide along over the stirrup 42 of the spring 40, which, however, still remains in engagement with said link and the lever 43, so that said lever is lifted coincidently with the rising movement of the forward end of the link 32 effected by the forward swinging of the toggle link 29. With the parts in this position, the rake head will be free to return to its operating position as soon as the tripping mechanism has functioned to release it from the ratchet mechanism, but if the operator wishes to hold the rake head up he may do so by pressing down on the foot lever 43 to cause its notch 44 to be engaged by the hook 31 on toggle link 29, as indicated by the dotted lines in Fig. 2. When the latter engagement takes place the toggle members may be held in the dotted line position by very light pressure on the foot lever, sufficient only to overcome the tension of the spring 40.

As has been explained, the weight of the operator tends to return the rake head to its operating position, but so long as the catch 31 remains in engagement with the notch 44 this weight is sustained by the lever 43 through compression strain exerted substantially along the length of said lever. As soon, however, as the operator releases said lever from pressure it will be lifted by the spring 40 out of engagement with the hook 31, and the parts will then automatically return approximately to the position shown in Fig. 1. In the latter position the lever 43 floats, that is to say it is supported by the spring 40 and is free to move in either direction for the purposes described.

It is to be understood that while I have described in detail the embodiment of my invention illustrated in the accompanying drawings, by so doing I have not intended to limit the claims hereinafter made to the particular construction shown and described, except in so far as claims may be directed expressly to such subject-matter, as my invention includes generically the subject-matter of the broader claims.

I claim:

1. In a dump rake comprisng a rake head provided with rake teeth, carrying wheels, means operable to dump the rake by rotation of said wheels, tripping mechanism for such dumping means, and a draft frame pivotally connected with the rake head, the combination with said elements of toggle mechanism interposed between the draft frame and the rake head, and a lever mounted on the draft frame, one of the members of said toggle mechanism being adapted to make latching engagement with said lever to hold up the rake teeth, out of operating position.

2. In a dump rake comprising a rake head provided with rake teeth, carrying wheels, means operable to dump the rake by rotation of said wheels, tripping mechanism for such dumping means, and a draft frame pivotally connected with the rake head, the combination with said elements, of a toggle interposed between the draft frame and the rake head comprising members movable approximately into alinement with each other when the rake teeth are in operating position, a spring extending between the draft frame and the toggle, and exerting its force to break the toggle, and a lever adapted to oppose the action of the spring and act upon said toggle mechanism to hold the rake teeth out of operating position.

3. In a dump rake comprising a rake head provided with rake teeth, carrying wheels, means operable to dump the rake by rotation of said wheels, tripping mechanism for such dumping means, and a draft frame pivotally connected with the rake head, the combination with said elements, of a toggle interposed between the draft frame and the rake head comprising members movable approximately into alinement with each other when the rake teeth are in operating position, a spring operably engaging said toggle and tending to break the latter, and a lever adapted to engage said toggle mechanism for moving the members thereof toward alignment to exert downward pressure upon the rake teeth.

4. In a dump rake comprising a rake head provided with rake teeth, carrying wheels, means operable to dump the rake by rotation of said wheels, tripping mechanism for such dumping means, and a draft frame pivotally connected with the rake head, the combination with said elements, of a toggle comprising members pivotally connected respectively with the draft frame and with the rake head, a pivot connecting said toggle members together, a lever pivoted on the draft frame and extending over the connection between said toggle members for applying downward pressure thereto, and a spring interposed between the draft frame and said toggle members and tending to break the toggle, said spring also engaging said lever and acting to support the same.

5. In a dump rake comprising a rake head provided with rake teeth, carrying wheels, means operable to dump the rake by rotation of said wheels, tripping mechanism for such dumping means, and a draft frame pivotally connected with the rake head, the combination with said elements, of a toggle comprising members pivotally connected respectively with the draft frame and with the rake head, a pivot connecting said toggle members together, said toggle members causing said rake teeth to be moved into operative position when substantially straightened and into dumping position when broken, a lever pivoted on the draft frame and extending over the connection between said toggle members when the rake head is in either its dumping or its operating position, whereby said lever may be operated to apply downward pressure to said toggle when broken to hold the rake teeth up or to exert downward pressure upon the rake teeth when said toggle is straightened, and means for latching the toggle to said lever to hold the rake teeth up out of operating position when said toggle is broken.

6. In a dump rake comprising a rake head provided with rake teeth, carrying wheels, means operable to dump the rake by rotation of said wheels, tripping mechanism for such dumping means, and a draft frame pivotally connected with said rake head and arranged to be lifted thereby when the rake head is turned to dumping position, the combination with said elements, of a lever mounted on the draft frame, and means adapted to be latchingly connected to and disconnected from said lever and when connected therewith to hold the rake teeth up out of operating position after the operation of the tripping mechanism.

7. In a dump rake comprising a rake head provided with rake teeth, carrying wheels, means operable to dump the rake by rotation of said wheels, tripping mechanism for such dumping means, and a draft frame pivotally connected with the rake head, the combination with said elements, of a toggle comprising members pivotally connected respectively with the draft frame and the rake head, a pivot connecting said toggle members together, a lever pivoted on the draft frame and extending over the connection between said toggle members for applying downward pressure thereto, a spring tending to break the toggle upwardly and to support said lever, and stop means carried by the draft frame for preventing said toggle from operating downwardly through dead center on the application of downward pressure thereon by said lever.

8. In a dump rake comprising a rake head provided with rake teeth, carrying wheels, means operable to dump the rake by the rotation of said wheels, tripping mechanism for such dumping means, and a draft frame pivotally connected with said rake head and arranged to be lifted thereby when the rake head is turned to dumping position, the combination with said elements, of a lever mounted on the draft frame, link means extending between the rake head and said draft frame for maintaining the rake teeth in operative or in inoperative position, latch means associated with said link means and adapted to be connected to and disconnected from said lever and when connected therewith to hold the rake teeth in inoperative position after the operation of the tripping mechanism, and spring means cooperating with the lever to move it out of latching engagement with said link means.

9. In a dump rake comprising a rake head provided with rake teeth, carrying wheels, means operable to dump the rake by the rotation of said wheels, tripping mechanism for such dumping means, and a draft frame pivotally connected with the rake head, the combination with said elements, of a toggle interposed between the draft frame and the rake head comprising members movable approximately into alignment with each other when the rake teeth are in operative position and movable out of alignment with each other when the rake teeth are in inoperative position, a lever for controlling the respective positions of said toggle members, cooperating latch means carried by said lever and one of said toggle members respectively for holding said rake teeth in inoperative position, and spring means coacting with said toggle members and said lever, to urge said members out of alignment with respect to each other when the rake teeth are in operative position and to urge said lever out of latching engagement with said toggle members when said rake teeth are in inoperative position.

WILBUR J. COULTAS.